US008953079B2

(12) United States Patent
Raju et al.

(10) Patent No.: US 8,953,079 B2
(45) Date of Patent: Feb. 10, 2015

(54) SYSTEM AND METHOD FOR GENERATING 360 DEGREE VIDEO RECORDING USING MVC

(71) Applicants: Veeramanikandan Raju, Bangalore (IN); Narasimhan Venkatraman, Plano, TX (US); Alberto Aguirre, Garland, TX (US)

(72) Inventors: Veeramanikandan Raju, Bangalore (IN); Narasimhan Venkatraman, Plano, TX (US); Alberto Aguirre, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 112 days.

(21) Appl. No.: 13/768,879

(22) Filed: Feb. 15, 2013

(65) Prior Publication Data

US 2014/0184850 A1 Jul. 3, 2014

Related U.S. Application Data

(60) Provisional application No. 61/747,769, filed on Dec. 31, 2012.

(51) Int. Cl.
*H04N 5/222* (2006.01)
*H04N 5/262* (2006.01)
*H04N 5/228* (2006.01)

(52) U.S. Cl.
CPC .................................. *H04N 5/2624* (2013.01)

USPC ................ 348/333.01; 348/222.1; 348/14.02; 348/333.12

(58) Field of Classification Search
CPC ............ H04N 1/2125; H04N 5/23293; H04N 5/2228; H04N 5/23277; H04N 5/3415
USPC ................... 348/14.01–14.02, 222.1, 333.01, 348/333.05, 333.12
See application file for complete search history.

(56) References Cited

U.S. PATENT DOCUMENTS

| | | | | |
|---|---|---|---|---|
| 7,295,614 | B1 * | 11/2007 | Shen et al. | 375/240.25 |
| 7,443,447 | B2 * | 10/2008 | Shirakawa | 348/376 |
| 7,982,762 | B2 * | 7/2011 | Chatting et al. | 348/14.07 |
| 8,451,312 | B2 * | 5/2013 | Lee et al. | 348/14.02 |
| 8,744,420 | B2 * | 6/2014 | Cranfill et al. | 455/416 |
| 2007/0279482 | A1 * | 12/2007 | Oswald et al. | 348/14.02 |
| 2011/0249076 | A1 * | 10/2011 | Zhou et al. | 348/14.02 |
| 2012/0120186 | A1 * | 5/2012 | Diaz et al. | 348/36 |
| 2012/0327172 | A1 * | 12/2012 | El-Saban et al. | 348/14.02 |
| 2014/0192199 | A1 * | 7/2014 | Tan et al. | 348/159 |

* cited by examiner

*Primary Examiner* — Hung Lam
(74) *Attorney, Agent, or Firm* — Ronald O. Neerings; Frederick J. Telecky, Jr.

(57) ABSTRACT

The present invention provides a system and method for combining asymmetrical camera views from a front racing and a back facing camera. Resizing and quality enhancement techniques are used to bring both front and back camera to same quality. Further, a panoramic mode of from camera and back camera are utilized to create a uniform stitching.

28 Claims, 5 Drawing Sheets

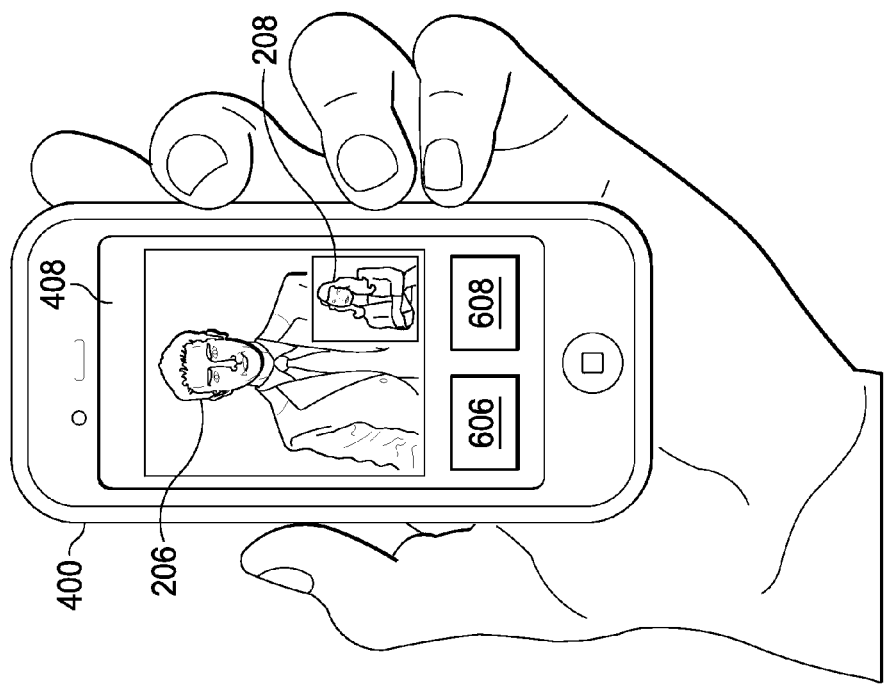
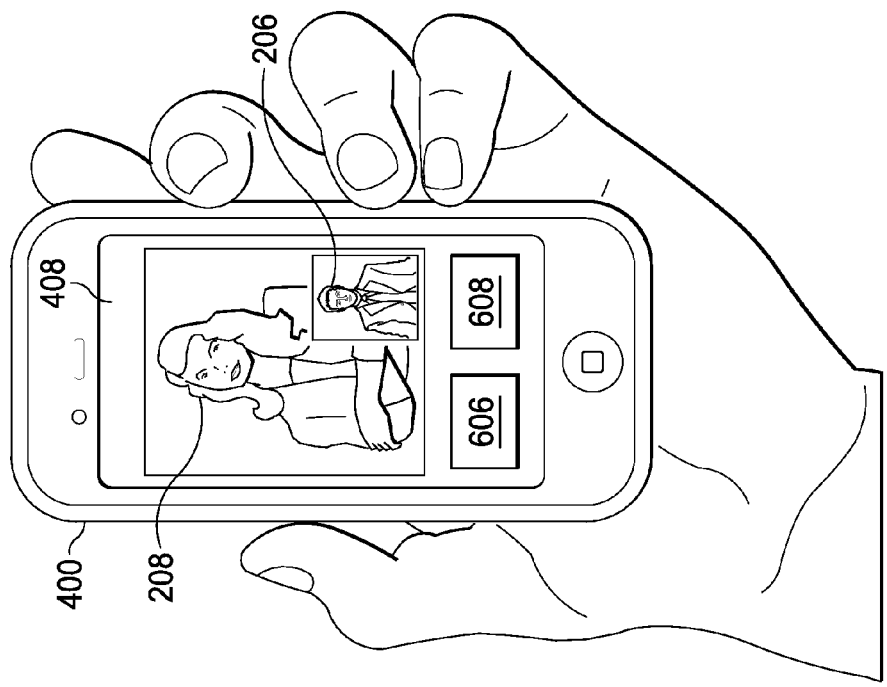

SYSTEM AND METHOD FOR GENERATING 360 DEGREE VIDEO RECORDING USING MVC

The present application claims priority from U.S. Provisional Application No. 61/747,769, filed Dec. 31, 2012, the entire disclosure of which is incorporated herein by reference.

BACKGROUND

In some conventional systems for displaying a 360-degree view of a space, multiple video or image capture devices are used to record pictures or videos of the space. Those pictures or videos are then stitched together using a conventional stitching manner in order to create a 360-degree view of the space.

In these conventional systems, the images or videos captured are typically of the same quality (resolution, brightness, image/video size, etc.) such that the stitching process is relatively straightforward. The stitching program will match the images or videos together, taking into consideration any slight changes in viewing height, angle, etc. and create a seamless stitched image or video.

Conventional systems do not address issues that may arise when attempting to stitch together images or videos captured by devices that do not have the same quality (resolution, brightness, image/video size, etc.).

There exists a need in the market to stitch images or video captured by devices with differing quality to create a seamless stitched video or image.

SUMMARY OF INVENTION

Aspects of the present invention provide a system and method for stitching images or video captured by devices with differing quality to create a seamless stitched video or image.

An embodiment of the present invention is drawn to a video device including a first video camera, a second video camera, a view synthesizer, a controller and an encoder. The first video camera is arranged to record a first video image of a first field of view and is operable to output a first stream of video data based on the first video image. The second video camera is arranged to record a second video image of a second field of view and is operable to output a second stream of video data based on the second video image. The view synthesizer is operable to perform one of generating a stitched video image stream, generating a first picture-in-picture video image stream and generating a second picture-in-picture video image stream. The generating of a stitched video image stream comprises stitching an adjusted first video image stream and an adjusted second video image stream. The adjusted first video image stream is based on the first video image stream. The adjusted second video image stream is based on the second video image stream. The stitched video image stream has a third field of view. The generating of a first picture-in-picture video image stream comprises replacing a first portion of the adjusted first video image stream corresponding to a first portion of an adjusted first video image with a second portion of the adjusted second video image stream corresponding to a second portion of an adjusted second video image. The generating of a second picture-in-picture video image stream comprises replacing a third portion of the adjusted second video image stream corresponding to a third portion of the adjusted second video image with a fourth portion of the adjusted first video image stream corresponding to a fourth portion of the adjusted first video image. The controller is operable to instruct the view synthesizer to output a raw video signal as one of the adjusted first video image stream, the adjusted second video image stream, the stitched video image stream, the first picture-in-picture video image stream and the second picture-in-picture video image stream. The encoder is operable to encode the raw video signal into an encoded signal.

BRIEF SUMMARY OF THE DRAWINGS

The accompanying drawings, which are incorporated in and form a part of the specification, illustrate example embodiments and, together with the description, serve to explain the principles of the invention. In the drawings:

FIGS. 6c-d illustrate additional embodiments of various options of viewing decoded video streams in accordance with embodiments of the present invention.

DETAILED DESCRIPTION OF THE INVENTION

The present invention discloses a system and method to provide a 360-degree view of a setting. The 360-degree view is created by using two cameras to capture videos of the same setting, with the lenses of the cameras pointed 180-degrees from each other. The two views created by the cameras can then be stitched together to create a single video in which the perspective of the setting to be viewed can be chosen by the user.

Stitching videos together from two cameras is a simple task when the cameras are the same or have similar recording characteristics. For example, when two cameras are used that record the video using the same resolution, angle, ambient lighting, etc., stitching the two videos together is easy because neither video needs to he modified to match the qualify of the other. While playing the stitched video, the user would be able to choose how to view the setting. The user may choose to view the setting through the first camera, the second camera, or even a picture-in-picture version of both cameras at the same time. In addition, if the user is viewing the setting on a smartphone, it may be possible to pan across the setting by tilting the smartphone to see different views of the setting.

When two cameras are used that have different recording characteristics, though, the stitching process becomes more complicated. At least one of the videos must be modified to match the quality of the other; otherwise the stitched video will look distorted when the user views it.

Figure 1:
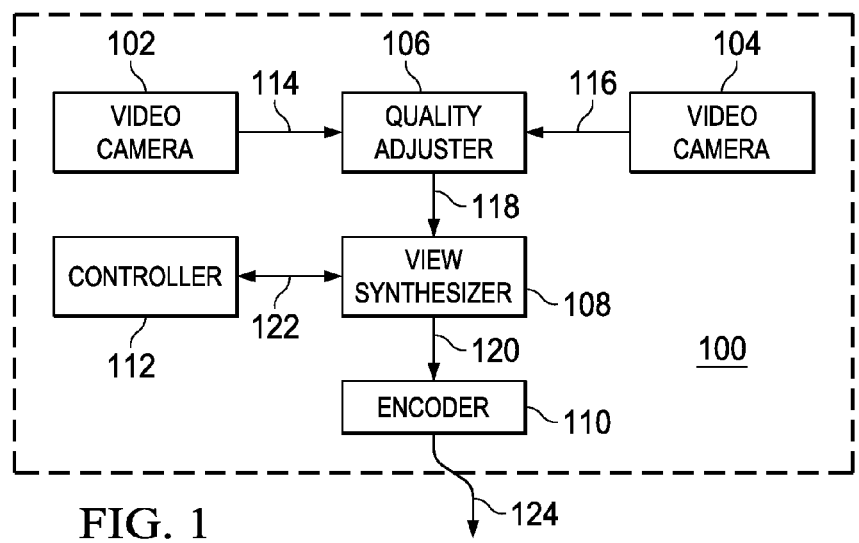
FIG. 1 illustrates a video device in accordance with embodiments of the present invention.

To overcome this issue, the present invention includes two aspects. First, the quality Of the videos may be adjusted during the recording and encoding portion of the process such that the quality of the videos is equivalent and provides for easier stitching. Second, the quality of the videos may be adjusted during the playing and decoding portion of the process such that the quality of the videos is equivalent and provides for easier stitching. In many cases, the quality adjustment will only need to occur during one of the recording/encoding or playing/decoding portions of the process, but there may also be instances where the quality adjustment would need to occur during both processes. FIGS. 1-3 are drawn to the recording/encoding of the video and FIGS. 4-6*d* are drawn to playing/decoding the video.

Example embodiments of the present invention will now be described with reference to FIGS. 1-6*d*.

FIG. 1 illustrates a video device in accordance with embodiments of the present invention.

As shown in the FIG., video device 100 includes a video camera 102, a video camera 104, a quality adjuster 106, a view synthesizer 108, an encoder 110 and a controller 112.

Quality adjuster 106 is arranged to receive a video stream 114 from video camera 102 and to receive a video stream 116 from video camera 104. View synthesizer 108 is arranged to receive an adjusted video stream 118 from quality adjuster 106 and to send/receive instructions 122 to/from controller 112. Encoder 110 is arranged to receive a stitched video stream 120 from view synthesizer 108 and output an encoded video stream 124.

In this example, video camera 102, video camera 104, quality adjuster 106, view synthesizer 108, encoder 110 and controller 112 are distinct elements. However, in some embodiments, at least two of video camera 102, video camera 104, quality adjuster 106, view synthesizer 108, encoder 110 and controller 112 may be combined as a unitary device. In other embodiments, at least one video camera 102, video camera 104, quality adjuster 106, view synthesizer 108, encoder 110 and controller 112 may be implemented as a computer having stored therein tangible, non-transitory, computer-readable media for carrying or having computer-executable instructions or data structures stored thereon. Such tangible, non-transitory, computer-readable media can be any available media that can be accessed by a general purpose or special purpose computer. Non-limiting examples of tangible, non-transitory, computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible, non-transitory, computer-readable medium. Combinations of the above should also be included within the scope of tangible, non-transitory, computer-readable media.

Video cameras 102 and 104 record live action that occurs in front of the camera lens. Video cameras 102 and 104 may be standalone (i.e., camcorders or pocket sized video cameras), or they may be integrated into a device with multiple functions (i.e., a cellular phone or MP3 player). Video cameras 102 and 104 may be equivalent devices in that the recording capabilities are equivalent, or they may not be equivalent devices in that the recording capabilities are not equivalent (i.e., there are differences in image resolution, brightness, size, etc.). In example embodiments, the lenses used in video cameras 102 and 104 may be a type of $f$-$\theta$ lens, which allows each video camera to capture video in a 180-degree space.

Video cameras 102 and 104 produce video streams 114 and 116, respectively, and send them to quality adjuster 106.

Video streams 114 and 116 are not altered from their native formats as recorded on video cameras 102 and 104. Video streams 114 and 116 may be in any of the following forms: 3GP, ASF, AVI, DVR-MS, FLV, F4V, IFF, MKV, JPEG 2000, QuickTime, MPEG, MPEG-2, MP4, RM, OGG, NUT, MXF, GXF, ratDVD, SVI, VOB, DivX, or any other conventional video format that can be recorded on a video camera.

Quality adjuster 106 is operable to adjust the quality of one or more incoming video streams such that, after the quality adjustment is complete, all video streams are of the same quality. Parameters that may be adjusted by quality adjuster 106 include video resolution, brightness, contrast, color, distortion, size, and any other parameter known to those of ordinary skill in the art of adjusting the quality of video streams.

Quality adjuster 106 generates adjusted video stream 118, based on video streams 114 and 116. Quality adjuster 106 is operable to create parity between video stream 114 and video stream 116 by adjusting a parameter of at least one of video stream 114 and video stream 116. Accordingly, all video streams included in adjusted video stream 118 will have similar resolution, brightness, contrast, color, distortion, size, and other parameters known to those of ordinary skill in the art.

View synthesizer 108 is arranged to receive video stream 118, to generate a single, stitched video stream 120 based on the user's input, and to bidirectionally communicate with controller 112. View synthesizer 108 may include any commercially available software for stitching two or more video streams into a single video stream. Some non-limiting examples of software that may be used in view synthesizer 108 include MindTree™, SceneTracker™, and any other software known to those of ordinary skill in the art of video stitching.

Stitched video stream 120 includes all versions of the stitched video streams that are created by view synthesizer 108. Stitched video stream 120 may be in any of the forms noted above with reference to video streams 114 and 116.

Encoder 110 is operable to encode a stitched video stream such that viewing the stitched video stream is convenient for the user. Encoder 110 may encode the stitched video stream in order to standardize the file format, transmission speed, security, file size, or any other parameter known by those of ordinary skill in the art of video encoding. In an example embodiment, encoder 110 encodes in a Multiview Video Coding (MVC), which is an amendment to H.264/MPEG-4 AVC video compression standard developed with joint efforts by MPEG/VCEG that enables efficient encoding of sequences captured simultaneously from multiple cameras using a single video stream.

Controller 112 is operable to bidirectionally communicate with view synthesizer 108 to send/receive instructions 122. Controller 112 provides a user access to view synthesizer 108 in order to control the views created by view synthesizer 108. Controller 112 will be further described with reference to FIG. 3.

In operation, video device 100 is turned on by the user and video cameras 102 and 104 begin to record videos of different subjects.

Figure 2A:
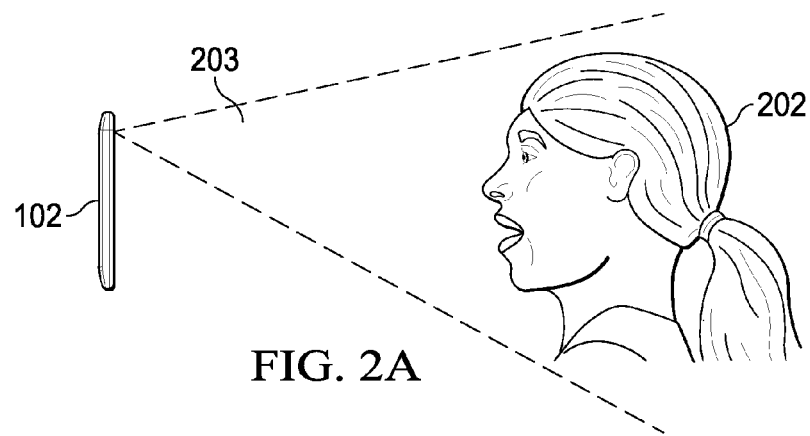
FIGS. 2a-d illustrate video recording devices capturing video of subjects in accordance with embodiments of the present invention.
Figure 2B:
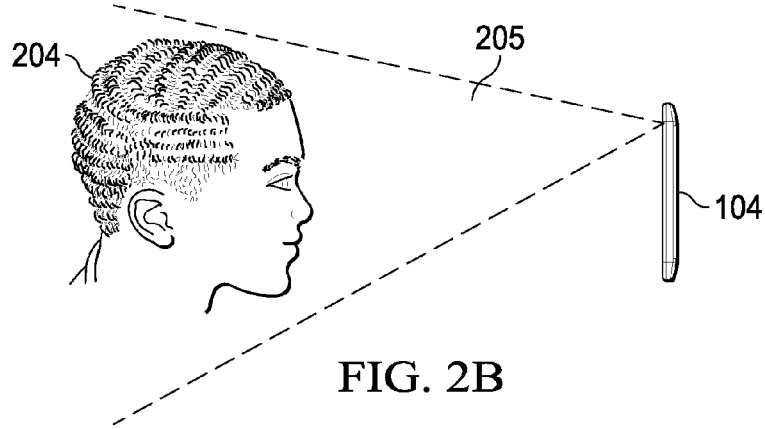
Figure 3:
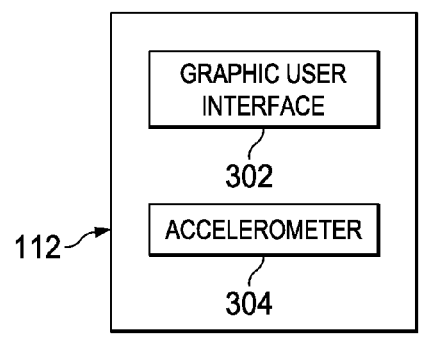
FIG. 3 illustrates an exploded view of the controller of the video device of FIG. 1.

FIGS. 2*a-b* illustrate an example scenario of video recording devices capturing video of subjects in accordance with embodiments of the present invention.

As shown in the figures, video of subject 202 is being captured by video camera 102, and video of subject 204 is being captured by video camera 104. Video camera 102 can capture video within capture window 203, and video camera 104 can capture video within capture window 205.

With reference to FIG. 1, the videos recorded, adjusted for quality, synthesized and encoded may be videos of subjects 202 and 204. As discussed above, video cameras 102 and 104 may be housed within the same device (where subjects 202 and 204 are in the same room), or they may be separate devices. In the case where video cameras 102 and 104 are separate devices, it is not necessary for subjects 202 and 204 to be in the same room. In fact, they may be very far apart, but the video streams generated from video cameras 102 and 104 may be sent (via wired or wireless manner) to quality adjuster 106 for further processing and subsequent synthesis. This type of situation may be of importance during an interview for a job, where the interviewer and interviewee may not be able to meet face to face, but instead conduct the interview via a webcam, Skype™, FaceTime™, or other communication mechanism in which the subjects can see and hear each other. In reviewing the interview, it may be beneficial to record video streams from both subjects and view the interview from the perspective of each subject.

Figure 2C:
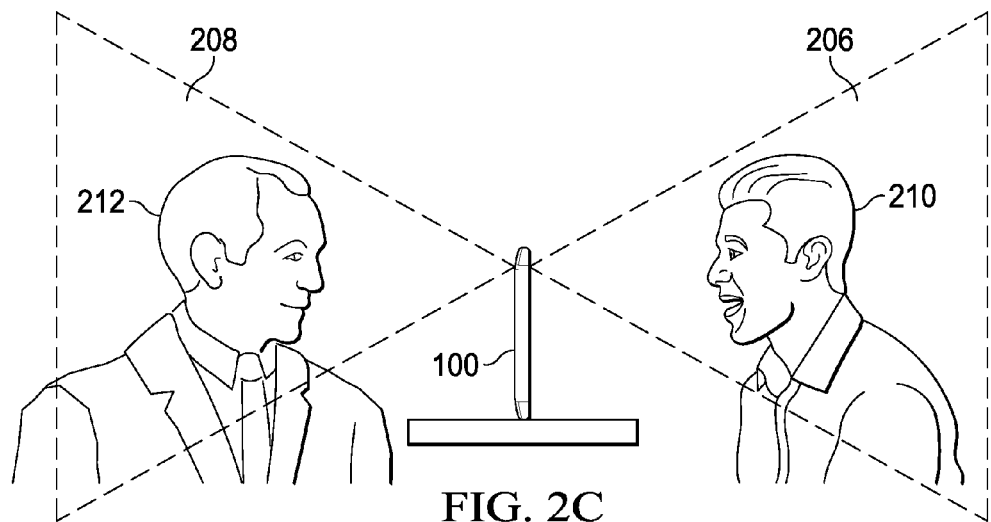
Figure 2D:
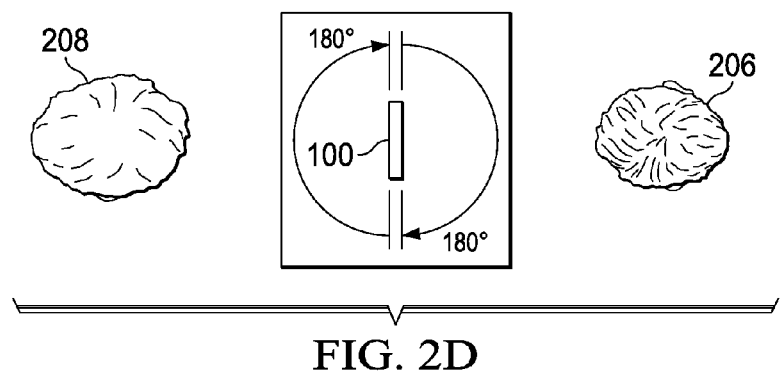

FIGS. 2c-d illustrate another example scenario of video recording devices capturing video of subjects in accordance with additional embodiments of the present invention.

As shown in FIG. 2c, subjects 210 and 212 are speaking with each other, and the conversation is being recorded by video device 100. The portion of subject 210 that is recorded by video device 100 is shown by capture window 206. The portion of subject 212 that is recorded by video device 100 is shown by capture window 208.

FIG. 2d depicts an overhead view of the situation shown in FIG. 2c. As shown in the figure, capture window 206 encompasses the entire space 180 degrees in front of video device 100, facing subject 210. In addition, capture window 208 encompasses the entire space 180 degrees in front of video device 100, facing the opposite direction toward subject 212. In order for capture windows 206 and 208 to capture video of a 180-degree space, it may be necessary for each camera within video device 100 to employ an $f$-$\theta$ lens, also known as a fisheye lens.

For purposes of explanation, the situation depicted in FIGS. 2c-d is an interview where subject 210 is interviewing subject 212 for a job opportunity. Subject 210 may want to record the interview session so it could be reviewed at another time by other individuals that may help to determine whether or not subject 212 is suitable for the position. Subject 210 would then place video device 100 on the table in between subjects 210 and 212 and begin recording. Video device 100 will record everything within capture windows 210 and 212 such that it can be viewed at a later time.

Regardless of whether the subjects are in different locations, as in the scenario depicted with reference to FIGS. 2a-b, or in the same location, as in the scenario depicted with reference to FIGS. 2c-d, the video streams will be processed the same way.

Returning to FIG. 1, as video camera 102 records, video stream 114 flows from video camera 102 to quality adjuster 106. As video camera 104 records, video stream 116 flows from video camera 104 to quality adjuster 106. For purposes of explanation, the resolution of video camera 102 is higher than that of video camera 104.

Quality adjuster 106 receives video streams 106 and 108 and compares the streams to determine if the quality of the streams needs to be adjusted prior to sending the streams to view synthesizer 108. if the quality needs to be adjusted, quality adjuster 106 will adjust the quality of video streams 106 and 108.

Quality adjuster 106 compares video streams 106 and 108 to determine any differences between the two streams. In this case, quality adjuster 106 would determine that video stream 114 is a higher resolution than video stream 116, and thus further processing is required to create a seamless view of the scene. Next, quality adjuster 106 adjusts the resolution of video stream 114, video stream 116, or both in order to create adjusted video stream 118 that contains the adjusted versions of video streams 106 and 108 such that the resolution of the video streams looks identical and there will not be a noticeable difference between the two streams when they are viewed by a user.

The output from quality adjuster 106 is adjusted video stream 118 that flows from quality adjuster 106 to view synthesizer 108. View synthesizer 108 receives instructions 122 from controller 112 that instructs view synthesizer 108 to generate a certain view from adjusted video stream 118. The process of generating commands for view synthesizer 108 will be discussed in further detail with reference to FIG. 3.

After receiving instructions 122 from controller 112, view synthesizer 108 creates the desired stitched video stream 120 from adjusted video stream 118 by blending the video streams contained within adjusted video stream 118 together to create a seamless view of the scene being recorded. Stitched video stream 120 is then sent to encoder 110 for further processing.

Encoder 110 receives stitched video stream 120 and encodes stitched video stream 120 to convert it to encoded video stream 124. The encoding process is a driven by a codec (a device or computer program that encodes a data stream or signal for transmission), and the encoding process may modify stitched video stream 120 to compress the video data into a smaller size, change the video format, increase the security of the video transmission, etc, such that transmitting the encoded video stream 124 is efficient. Again, in an example embodiment, encoder 110 encodes in a MVC codec.

FIG. 3 illustrates an exploded view of the controller of the video device of FIG. 1.

As shown in the figure, controller 112 includes graphic user interface 302 and accelerometer 304.

Graphic user interface 302 is a way for the user to communicate with view synthesizer 108 from FIG. 1 and inform view synthesizer 108 which view to create. Graphic user interface 302 may include a touchscreen, where the user can physically touch a screen to provide input, or it may include a screen where options may be highlighted using another system and method (e.g., a mouse, trackpad, etc.) to provide input.

Accelerometer 304 is a device that communicates with view synthesizer 108 from FIG. 1 to inform view synthesizer 108 of updates to be made within the current view being displayed. Accelerometer 304 is operable to determine the orientation of video device 100 as it is moved and rotated.

In operation, a user may use graphic user interface 302 to enter a preference of how to record a certain video. That preference is relayed back to view synthesizer 108 of FIG. 1, and view synthesizer 108 creates the desired view as described with reference to FIG. 1 above. In addition, accelerometer 304 may be used to enter additional preferences to be relayed back to view synthesizer 108. These preferences include recording angle, rotating, panning, or any other preferences that may be relayed by the use of an accelerometer and the associated motion thereof. The preferences would be determined by changing the physical position or orientation of video device 100.

Figure 4A:
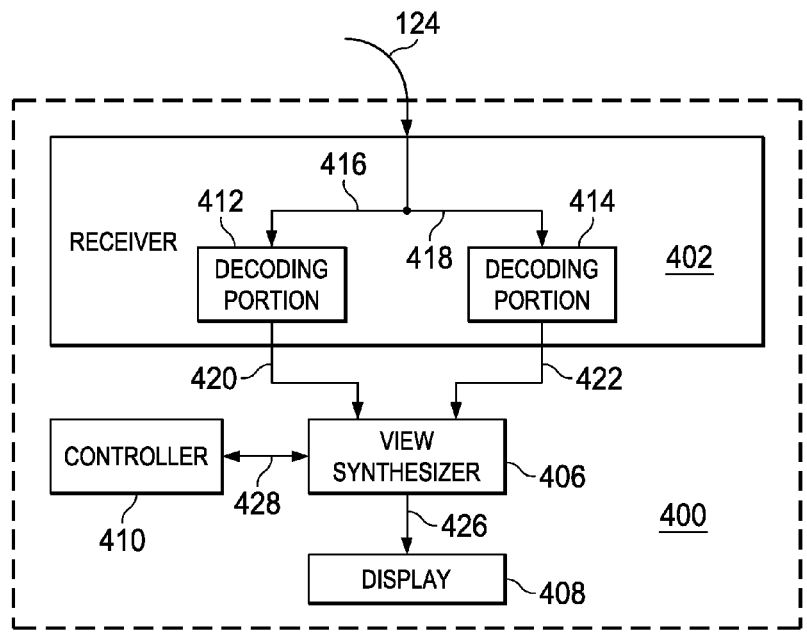
FIGS. 4a-b illustrates a video display device in accordance with embodiments of the present invention.

FIG. 4a illustrates a video display device in accordance with embodiments of the present invention.

As shown in the figure, video display device 400 includes receiver 402, view synthesizer 406, display 408 and controller 410. Receiver 402 includes decoding portions 412 and 414.

Receiver 402 is operable to receive encoded video stream 124. Encoded video stream 124 may include multiple individual encoded video streams, and receiver 402 is operable to separate the single encoded video stream 124 into multiple encoded video streams. The number of encoded video streams generated will be equivalent to the original number of video streams recorded. In this case, encoded video stream 124 is separated in to encoded video streams 416 and 418. Receiver 402 may be referred to as a digital media receiver (DMR), media extender, media streamer, digital media hub, digital media adapter, or any other common name by which a receiver is known by those of ordinary skill in the art.

Encoded video streams 416 and 418 are video data that have been encoded from then native file formats in order to either compress the video data into a smaller size, change the video format, increase the security of the video transmission, etc, such that viewing encoded video steams 416 and 418 is simple for the user.

Decoding portions 412 and 414 are arranged to receive encoded video streams 416 and 418 and decode them to create decoded video streams 420 and 422 to prepare them for display or viewing. Decoding portions 412 and 414 may include a codec, which would perform the decoding operation on the encoded video streams. In an example embodiment, decoding portions 412 and 414 are able to decode streams that have been encoded with an MVC codec.

Decoded video streams 420 and 422 are sent from decoding portions 412 and 414 to view synthesizer 406. Decoded video streams 420 and 422 may be of any of the video formats discussed above with reference to video streams 106 and 108.

View synthesizer 406 is arranged to receive decoded video streams 420 and 422 and generate a single, stitched video steam 426 based on the user's input, and to send/receive instructions 428 with controller 410. View synthesizer 406 may include any commercially available software for stitching two or more video streams into a single video stream. Some non-limiting examples of software that may be used in view synthesizer 420 include MindTree™, SceneTracker™, and any other software known to those of ordinary skill in the art of video stitching.

Display 408 may include any device capable of receiving stitched video stream 426 and showing the video, including a television, computer screen, smartphone, combination MP3 player, or any other display known by those of ordinary skill in the art that may be able to receive a video stream and show the video.

Controller 410 is operable to bidirectionally communicate with view synthesizer 406 to send/receive instructions 428. Controller 410 provides a user access to view synthesizer 406 in order to control the video output displayed to the user. Controller 410 will be further described with reference to FIG. 5.

In this example, receiver 402, view synthesizer 406, display 408, controller 410, decoding portion 412 and decoding portion 414 are distinct elements. However, in some embodiments, at least two of receiver 402, view synthesizer 406, display 408, controller 410, decoding portion 412 and decoding portion 414 may be implemented as a computer having stored therein tangible, non-transitory, computer-readable media for carrying or having computer-executable instructions or data structures stored thereon.

In an example scenario, an individual not present at the interview discussed with reference to FIGS. 2c-d would like to view video of the interview. To do so, the individual would turn on video display device 400, and receiver 402 would receive encoded video stream 124. Receiver 402 would split encoded video stream 124 into separate encoded video streams 416 and 418, as discussed above. In this example, encoded video stream 124 is split into two separate video streams because the original video streams originated from two separate video capture devices. If the original video streams originated from three separate video capture devices, then the encoded video stream would be split into three separate video streams, etc.

Encoded video streams 416 and 418 are sent to decoding portions 412 and 414, respectively, where video streams 416 and 418 are decoded to prepare them for viewing. As described above, the decoding operation may be accomplished by employing a codec known by those of ordinary skill in the art.

After decoding, decoded video streams 420 and 422 are sent to view synthesizer 406, where they will be stitched together and the view will be prepared according to instructions 428 received from controller 410.

After receiving instructions 428 from controller 410, view synthesizer 406 creates the desired stitched video stream 426 from decoded video streams 420 and 422 by blending the video streams together to create a seamless view of the scene being viewed. Stitched video stream 426 is then sent to display 408.

Display 408 receives the stitched video stream and shows stitched video stream 426 such that a user can view stitched video stream 426.

With reference to FIGS. 6a-d, some example viewing scenarios are shown according to aspects of the present invention.

Figure 6B:
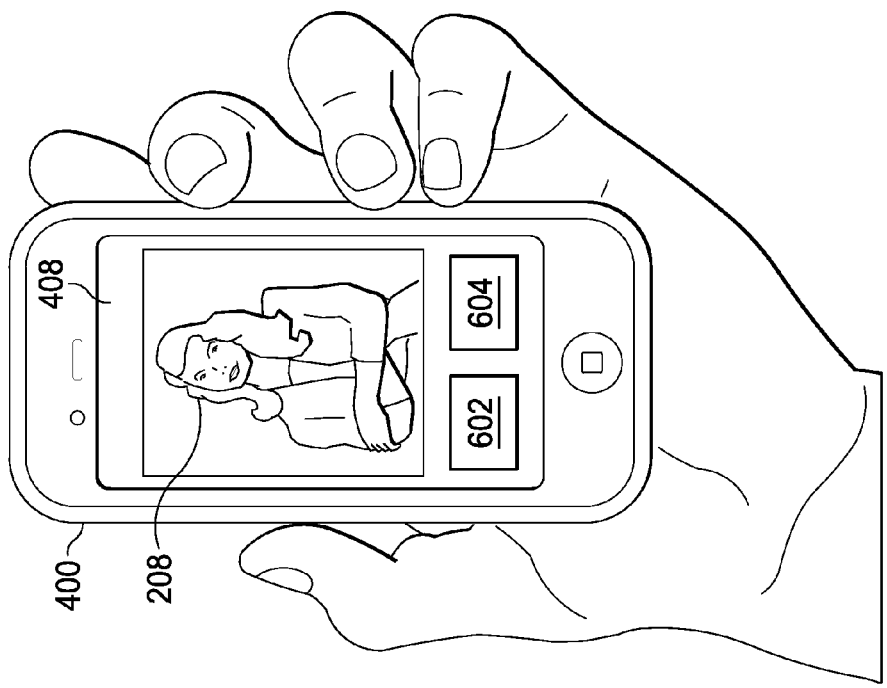
FIGS. 6a-b illustrate embodiments of various options of viewing decoded video streams in accordance with embodiments of the present invention.
Figure 6A:
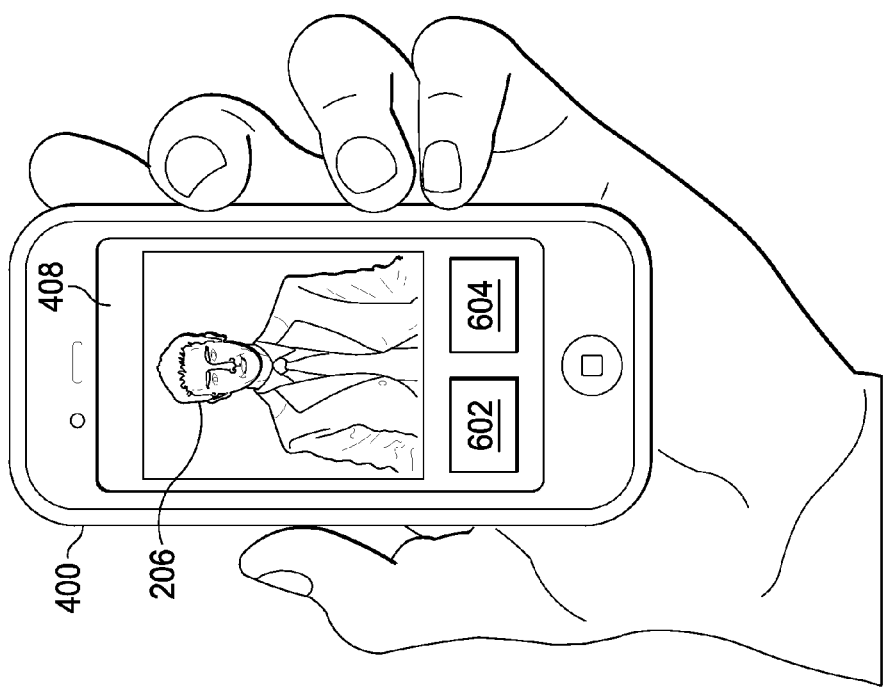

As shown in FIG. 6a, video display device 400 includes an image of subject 206 on display 408 and toggle buttons 602 and 604.

As shown in FIG. 6b, video display device 400 includes an image of subject 208 on display 424 and toggle buttons 602 and 604.

In one instance, and with reference to FIGS. 6a-b, the user would like to see subjects 206 or 208 on the full screen of display 424, and this preference would be entered into video display device 400 via controller 410.

Figure 5:
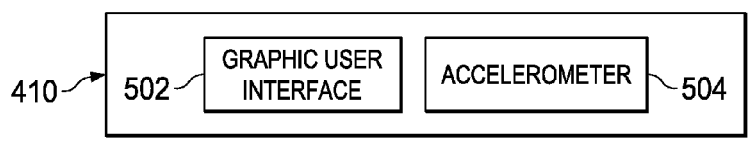
FIG. 5 illustrates an exploded view of the controller of the video display device of FIG. 4.

Referring now to FIG. 5, controller 410 includes graphic user interface 502 and accelerometer 504.

Graphic user interface 502 is a way for the user to communicate with view synthesizer 406 from FIG. 4a and inform view synthesizer 406 which view to create for viewing. Graphic user interface 502 may include a touchscreen, where the user can physically touch a screen to provide input, or it may include a screen where options may be highlighted using another method (e.g., a mouse, trackpad, etc.) to provide input.

Accelerometer 504 is a device that communicates with view synthesizer 406 from FIG. 4a to inform view synthesizer 406 of updates to be made within the current view being displayed. Accelerometer 504 is operable to determine the orientation of video display device 400 as it is moved and rotated.

Referring back to FIGS. 4a and 5, the user inputs the preference to view the video of one of subjects 206 or 208 via graphic user interface 502. Controller 410 relays the instructions 428 to view synthesizer 406, which generates the desired view and sends the stitched video stream 426 to display 408.

Referring back to FIGS. 6a-b, the user is presented with an option to view video of either subject 206 or 208 via the use of toggle buttons 602 and 604. Toggle buttons 602 and 604 allow the user to toggle the view between subject 206 and subject 208. For instance, pressing toggle button 604 may prompt display 408 to show video of subject 208, and pressing toggle button 602 may prompt display 408 to show video of subject 206. In the example of the interview from FIG. 2*c*-*d*, the user may want to watch subject 206 ask a question and then subsequently watch subject 208 answer the question. In this case, the user may press toggle button 602 to show the video of subject 206 asking the question on display 408, and then press toggle button 604 after the question is asked so that the video of subject 208 answering the question is shown on display 408.

Referring again to FIGS. 4*a* and 5, while the user is viewing either subject 206 or 208 on display 408, it may be desirable to view other parts of the room. For example, the viewer may want to see if subject 208 is fidgeting with his hands while answering a question, which may indicate that he is nervous or potentially fabricating his response. In this case, the user would simply tilt video display device 400 down, which would trigger accelerometer 504 to notify view synthesizer 406 that the desired view has changed and thus needs to be modified. View synthesizer would then generate the updated view as desired and send the new stitched video stream 426 to display 408. The user would then see the hands of subject 208 to determine whether or not he was fidgeting while answering a question.

In another instance, and with reference to FIGS. 6*c*-*d*, the user would like to see subjects 206 and 208 on display 408 at the same time via picture-in-picture.

As shown in FIG. 6*c*, video display device 400 includes images of subjects 206 and 208 on display 408, and toggle buttons 606 and 608.

As shown in FIG. 6*d*, video display device 400 includes images of subjects 206 and 208 on display 424, and toggle buttons 606 and 608.

Referring back to FIGS. 4*a* and 5, the user inputs the preference to view picture-in-picture videos of subjects 206 and 208 via graphic user interface 502. Controller 410 relays instructions 428 to view synthesizer 406, which generates the desired view and sends the stitched video stream 426 to display 408.

Referring back to FIG. 6*c*-*d*, the user is presented with an option to view a picture-in-picture video of either subject 206 or 208 as the larger picture via the use of toggle buttons 606 and 608. Toggle buttons 606 and 608 allow the user to toggle the views to show subject 206 or subject 208 as the larger video. For instance, pressing toggle button 606 may prompt display 408 to show a large video of subject 208 and a smaller video of subject 206 within the large video, and pressing toggle button 608 may prompt display 408 to show a large video of subject 206 and a smaller video of subject 208 within the large video, in the example of the interview from FIG. 2*c*-*d*, the user may want to watch both subjects 206 and 208 during the interview, but may want to focus on different subjects during different times. For instance, the user may want to focus on subject 206 asking a question and then subsequently focus on subject 208 answering the question. In this case, the user may press toggle button 608 to show the larger video of subject 206 asking the question with the smaller video of subject 208 within the large video on display 408, and then press toggle button 606 after the question is asked so that the video of subject 208 answering the question becomes the large video shown on display 408, with the video of subject 206 becoming the smaller video within the large video.

Referring again to FIGS. 4*a* and 5, while the user is viewing either of the views from FIGS. 6*c*-*d* on display 408, it may be desirable to view other parts of the room. For example, the viewer may want to see if subject 208 is fidgeting with his hands while answering a question, which may indicate that he is nervous or potentially fabricating his response. In this case, the user would simply tilt video display device 400 down, which would trigger accelerometer 504 to notify view synthesizer 406 that the desired view has changed and thus needs to he modified. View synthesizer would then generate fee updated view as desired and send the new stitched video stream 426 to display 408. The user would then see the hands of subject 208 to determine whether or not he was fidgeting while answering a question.

With the picture-in-picture views discussed in FIGS. 6*c*-*d*, and in one embodiment of tilting video display device 400 to alter the view on display 424, video display device 400 may only alter the view of the larger video in response to video display device 400 being tilted. In another embodiment of tilting video display device 400 to alter the view on display 424, video display device 400 may only alter the view of the smaller video in response to video display device 400 being tilted. In yet another embodiment of tilting video display device 400 to alter the view on display 424, video display device 400 may alter both the larger and smaller videos in response to video display device 400 being tilted.

Figure 4B:
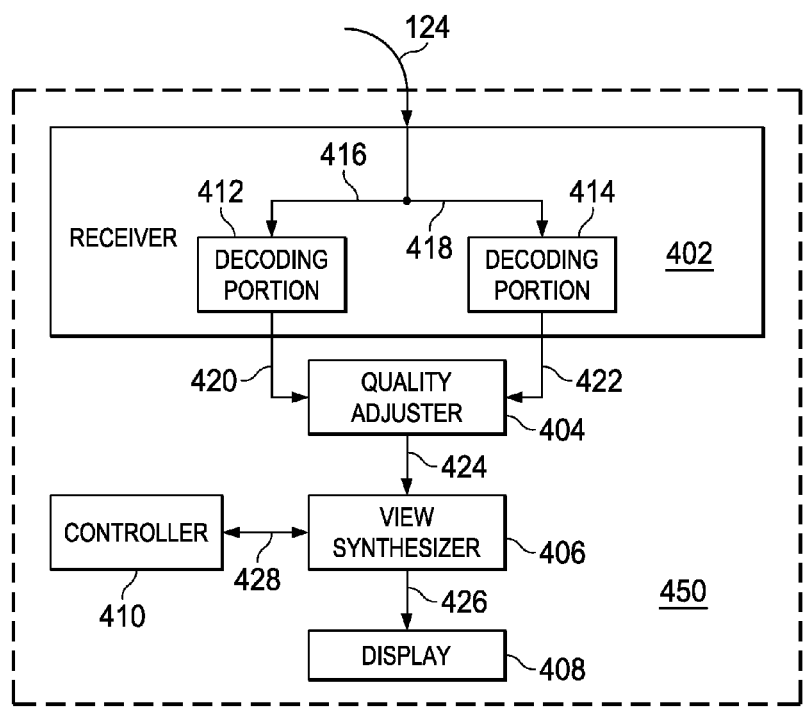

FIG. 4*b* illustrates an alternate embodiment of a video display device in accordance with aspects of the present invention.

As shown in the figure, video display device 450 includes all elements included within video display device 400, with the addition of quality adjuster 404.

Quality adjuster 404 is operable to adjust the quality of one or more decoded incoming video streams such that, after the quality adjustment is complete, all decoded video streams are of the same quality. Parameters that may be adjusted by quality adjuster 404 include video resolution, brightness, contrast, color, distortion, size, and any other parameter known to those of ordinary skill in the art of adjusting the quality of video streams.

Quality adjuster 404 is arranged to receive decoded video streams 420 and 422 and adjust the quality of the streams and output adjusted video stream 424 that is sent to view synthesizer 406.

In operation, encoded video stream 124 would be received and decoded in a manner equivalent to that described with reference to FIG. 4. In this case, however, the quality adjuster is present to verify that the quality of the video streams has not been degraded by the encoding/decoding processes.

Quality adjuster 404 receives decoded video streams 420 and 422 and compares the streams to determine if the quality of the streams needs to be adjusted prior to sending the streams to view synthesizer 406. The quality of the streams may have been affected by the encoding/decoding process, and quality adjuster 404 checks to see if any such losses have occurred. If the quality needs to be adjusted, quality adjuster 404 will adjust the quality of video streams 420 and 422.

Quality adjuster 404 compares decoded video streams 420 and 422 to determine any differences between the two streams. In this ease, and as a non-limiting example, quality adjuster 404 may determine that decoded video stream 420 is a higher resolution than decoded video stream 422, and thus further processing is required to create a seamless view of the scene. Next, qualify adjuster 404 adjusts the resolution of decoded video stream 420, decoded video stream 422, or both in order to create adjusted video stream 424 that contains the adjusted versions of decoded video streams 420 and 422 such that the resolution of the Video streams looks identical and there will not be a noticeable difference between the two streams when they are viewed by a user.

The output from quality adjuster 404 is adjusted video stream 424 that flows from quality adjuster 404 to view synthesizer 406. View synthesizer 406 receives instructions 428 from controller 410 that instructs view synthesizer 406 to generate a certain view from adjusted video stream 424. The process of generating commands for view synthesizer 406 has been previously described with reference to FIGS. 6a-d.

Quality adjuster 404 may only be necessary within video display device 450 if there is no quality adjustment when the videos are recorded by one or more video devices, however it may be desirable to have an additional quality adjuster to assure that the video streams are not corrupted during the encoding/decoding process. The options for including a quality adjuster include: quality adjusters included on both video recording and display devices, a quality adjuster included only on the video recording device (as shown in FIG. 1) or a quality adjuster included only on the video display device.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A video device comprising:
   a first video camera arranged m record a first video image of a first field of view and is operable to output a first stream of video dam based on the first video image;
   a second video camera arranged to record a second video image of a second field of view and is operable to output a second stream of video data based on the second video image;
   a view synthesizer operable to perform selectively one of generating a stitched video image stream, generating a first picture-in-picture video image stream and generating a second picture-in-picture video image stream, the generating of a stitched video image stream comprises stitching an adjusted first video image stream and an adjusted second video image stream, the adjusted first video image stream being based, on the first video image stream, the adjusted second video image stream being based on the second video image stream, the stitched video image stream having a third field of view, the generating of a first picture-in- picture video image stream comprises replacing a first portion of the adjusted first video image stream corresponding to a first portion of an adjusted first video image with a second portion of the adjusted second video image stream corresponding to a second portion of an adjusted second video image, the generating of a second picture-in-picture video image stream comprises replacing a third portion of the adjusted second video image stream corresponding to a third portion of the adjusted second video image with a fourth portion of the adjusted first video image stream corresponding to a fourth portion of the adjusted first video image;
   a controller operable to instruct said view synthesizer to output a raw video signal as one of the adjusted first video image stream, the adjusted second video image stream, the stitched video image stream, the first picture-in-picture video image stream and the second picture-in-picture video image stream; and
   an encoder operable to encode the raw video signal into an encoded signal.

2. The video device of claim 1, further comprising a quality adjuster operable to generate the adjusted first video image stream and the adjusted second video image stream.

3. The video device of claim 2,
   wherein said first video camera is operable to record the first video image at a first magnification,
   wherein said second video camera is operable to record the second video image at a second magnification,
   wherein said quality adjuster is further operable to generate the stitched video image stream such that the adjusted first video image has the second magnification, and
   wherein the first magnification is different than the second magnification.

4. The video device of claim 2,
   wherein said first video camera is operable to record the first video image at a first average luminance,
   wherein said second video camera is operable to record the second video image at a second average luminance,
   wherein said quality adjuster is further operable to generate the stitched video image stream such that the adjusted first video image has the second average luminance, and
   wherein the first average luminance is different than the second average luminance.

5. The video device of claim 2,
   wherein said first video camera is operable to record the first video image at a first resolution,
   wherein said second video camera is operable to record the second video image at a second resolution,
   wherein said quality adjuster is further operable to generate the stitched video image stream such that the adjusted first video image has the second resolution, and
   wherein the first resolution is different than the second resolution.

6. The video device of claim 1, wherein said encoder is operable to encode the raw video signal into an encoded signal using an encoding scheme that encodes sequential images captured simultaneously from said first video camera and from said second video camera.

7. The video device of claim 1, wherein said controller comprises a graphic user interface.

8. The video device of claim 1, wherein said controller comprises an accelerometer.

9. A video device for use with a first encoded video stream and a second encoded video stream, the first: encoded video stream corresponding m a first s, video image of a first: field of view, the second encoded video stream corresponding to a second video image of a second field of view, said video device comprising:
   a first decoding portion operable to generate a first video image stream corresponding to the first encoded, video stream:
   a second decoding portion operable to generate a second video image stream corresponding to the second encoded video stream;
   a view synthesizer operable to perform selectively one of generating a stitched video image stream, generating a first picture-in- picture video image stream and generating a second picture-in-picture video image stream, the generating of a stitched video image stream comprises stitching an adjusted first video image stream and an adjusted second video image stream, the adjusted first video image stream being based on the first video image stream, the adjusted second video image stream being based on the second video image stream, the stitched video image stream having a third field of view, the generating of a first picture-in- picture video image stream comprises replacing a first portion of the adjusted first video image stream corresponding to a first portion of an adjusted first video image with a second portion of the adjusted second video image stream corresponding to a second portion of an adjusted second video image, the generating of a second picture-in-picture video image stream comprises replacing a third portion of the adjusted second video image stream corresponding to a third portion of the adjusted second video image stream with a fourth portion of the adjusted first video image stream corresponding to a fourth portion of the adjusted first video image; and a controller operable to instruct said view synthesizer to output a raw video signal as one of the adjusted first video image stream, the adjusted second video image stream, the stitched video image stream, the first picture-in-picture video image stream and the second picture-in-picture video image stream.

10. The video device of claim 9, further comprising a quality adjuster operable to generate the adjusted first video image stream and the adjusted second video image stream.

11. The video device of claim 10,
wherein said first video camera is operable to record the first video image at a first magnification,
wherein said second video camera is operable to record the second video image at a second magnification,
wherein said quality adjuster is further operable to generate the stitched video image stream such that the adjusted first video image has the second magnification, and
wherein the first magnification is different than the second magnification.

12. The video device of claim 10,
wherein said first video camera is operable to record the first video image at a first average luminance,
wherein said second video camera is operable to record the second video image at a second average luminance,
wherein said quality adjuster is further operable to generate the stitched video image stream such that the adjusted first video image has the second average luminance, and
wherein the first average luminance is different than the second average luminance.

13. The video device of claim 10,
wherein said first video camera is operable to record the first video image at a first resolution,
wherein said second video camera is operable to record the second video image at a second resolution,
wherein said quality adjuster is further operable to generate the stitched video image stream such that the adjusted first video image has the second resolution, and
wherein the first resolution is different than the second resolution.

14. The video device of claim 9, wherein said first decoding portion is operable to decode the first encoded video stream into the first video image stream using a decoding scheme that decodes sequential images captured simultaneously from a first video camera and from a second video camera.

15. The video device of claim 9, wherein said controller comprises a graphic user interface.

16. The video device of claim 9, wherein said controller comprises an accelerometer.

17. A method comprising:
recording, via a first video camera, a first video image of a first field of view;
outputting, via the first video camera, a first stream of video data based on the first video image;
recording, via a second video camera, a second video image of a second field of view;
outputting, via the second video camera, a second stream of video data based on the second video image;
performing selectively, via a view synthesizer, one of generating a stitched video image stream, generating a first picture-in-picture video image stream and generating a second picture-in- picture video image stream, the generating of a stitched video image stream comprises stitching an adjusted first video image stream and an adjusted second video image stream, the adjusted first video image stream being based on the first video image stream, the adjusted second video image stream being based on the second video image stream, the stitched video image stream having a third field of view, the generating of a first picture-in-picture video image stream comprises replacing a first portion of the adjusted first video image stream corresponding to a first portion of an adjusted first video image with a second portion of the adjusted second video image stream corresponding a second portion of an adjusted second video image, the generating of a second, picture-in-picture video image stream comprises replacing a third portion of the adjusted second video image stream corresponding to a fourth portion of the adjusted second video image with a fourth portion of the adjusted first video image stream corresponding to a fourth portion of the adjusted first video image;
instructing, via a controller, the view synthesizer to output a raw video signal as one of the adjusted first video image stream, the adjusted second video image stream, the stitched video image stream, the first picture-in-picture video image stream and the second picture-in-picture video image stream; and
encoding, via an encoder, the raw video signal into an encoded signal.

18. The method of claim 17, further comprising generating, via a quality adjuster, the adjusted first video image stream and the adjusted second video image stream.

19. The method of claim 18, further comprising:
generating, via the quality adjuster, the stitched video image stream such that the adjusted first video image has a second magnification,
wherein said recording, via a first video camera, a first video image of a first field of view comprises recording the first video image at a first magnification,
wherein said recording, via a second video camera, a second video image of a second field of view comprises recording the second video image at the second magnification, and
wherein the first magnification is different than the second magnification.

20. The method of claim 18,
generating, via the quality adjuster, the stitched video image stream such that the adjusted first video image has a second average luminance,
wherein said recording, via a first video camera, a first video image of a first field of view comprises recording the first video image at a first average luminance, wherein said recording, via a second video camera, a second video image of a second field of view comprises recording the second video image at the second average luminance, and wherein the first average luminance is different than the second average luminance.

21. The method of claim 18, generating, via the quality adjuster, the stitched video image stream such that the adjusted first video image has a second resolution, wherein said recording, via a first video camera, a first video image of a first field of view comprises recording the first video image at a first resolution, wherein said recording, via a second video camera, a second video image of a second field of view comprises recording the second video image at the second resolution, and wherein the first resolution is different than the second resolution.

22. The method of claim 17, further comprising encoding, via the encoder, the raw video signal into an encoded signal using an encoding scheme that encodes sequential images captured simultaneously from said first video camera and from said second video camera.

23. A method of using a first encoded video stream and a second encoded video stream, the first encoded video stream corresponding to a first video image of a first field of view, the second encoded video stream corresponding to a second video image of a second field of view, said method comprising:

generating, via a first decoding portion, a first video image stream corresponding to the first encoded video stream;

generating, via a second decoding portion, a second video image stream corresponding to the second encoded video stream;

performing selectively, via a view synthesizer, one of generating a stitched video image stream, generating a first picture-in-picture video image stream and generating a second picture-in-picture video image stream, the generating of a stitched video image stream comprises stitching an adjusted first video image stream and an adjusted second video image stream, the adjusted first video image stream being based on the first video image stream, the adjusted second video image stream being based, on the second video image stream, the stitched video image stream having a third field of view, the generating of a first picture-in-picture video image stream comprises replacing a first portion of the adjusted first video image stream corresponding to a first portion of an adjusted first video image with a second portion of the adjusted second video image stream corresponding to a second portion of an adjusted second video image, the generating of a second picture-in-picture video image stream comprises replacing a third portion of the adjusted second video image stream corresponding to a third portion of the adjusted second video image with a fourth portion of the adjusted first video image stream corresponding to a fourth portion of the adjusted first video image; and instructing, via a controller, the view synthesizer to output a raw video signal as one of the adjusted first video image stream, the adjusted second video image stream, the stitched video image stream, the first picture-in-picture video stream and the second picture-in- picture video image stream.

24. The method of claim 23, further comprising generating, via a quality adjuster, the adjusted first video image stream and the adjusted second video image stream.

25. The method of claim 24, further comprising:

generating, via the quality adjuster, the stitched video image stream such that the adjusted first video image has a second magnification, wherein the first video image is at a first magnification, wherein the second video image is at a second magnification, and wherein the first magnification is different than the second magnification.

26. The method of claim 24, generating, via the quality adjuster, the stitched video image stream such that the adjusted first video image has a second average luminance, wherein the first video image is at a first average luminance, wherein the second video image is at a second average luminance, and wherein the first magnification is different than the second average luminance.

27. The method of claim 24, generating, via the quality adjuster, the stitched video image stream such that the adjusted first video image has a second resolution, wherein the first video image is at a first resolution, wherein the second video image is at a second resolution, and wherein the first magnification is different than the second resolution.

28. The method of claim 23, further comprising decoding, via a decoding portion, the first encoded video stream into the first video image stream using a decoding scheme that decodes sequential images captured simultaneously from a first video camera and from a second video camera.

* * * * *